UNITED STATES PATENT OFFICE.

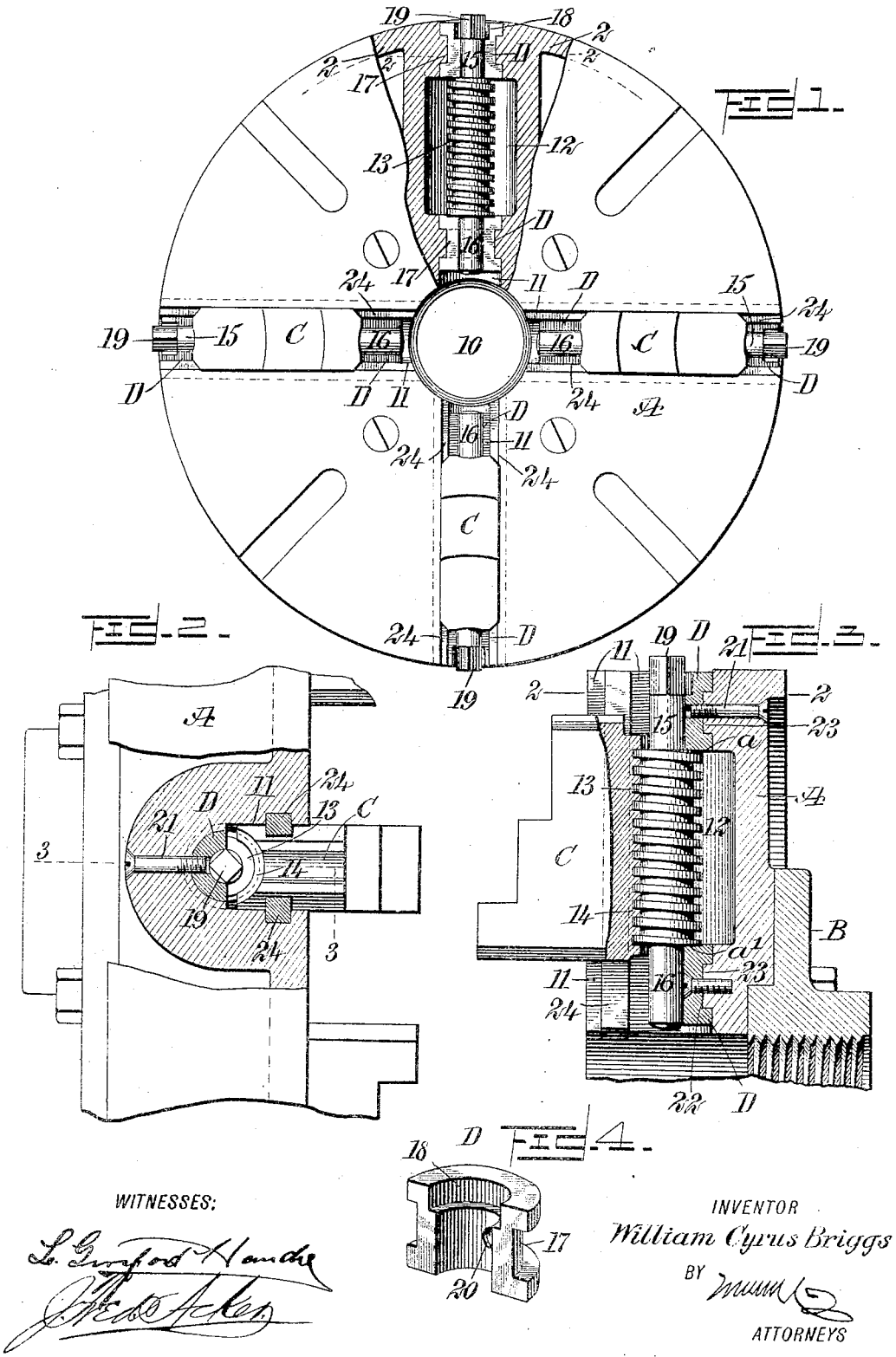

WILLIAM CYRUS BRIGGS, OF ELIZABETH, NEW JERSEY.

LATHE-CHUCK.

No. 803,984.        Specification of Letters Patent.        Patented Nov. 7, 1905.

Application filed February 23, 1905. Serial No. 246,874.

*To all whom it may concern:*

Be it known that I, WILLIAM CYRUS BRIGGS, a citizen of the United States, and a resident of Elizabeth, in the county of Union and State of New Jersey, have invented a new and useful Improvement in Lathe-Chucks, of which the following is a full, clear, and exact description.

It has been found in practice that all lathe-chucks suffer a great amount of undue wear from dust, dirt, and iron chips and that in ordinary use the strain and the wear are of necessity carried on very small surfaces at points where the adjusting-screws bear on the carrier or chuck body, at which points they soon give out, rendering the chuck useless. The purpose of the invention is to avoid such waste and provide a chuck the body or carrier whereof can be made of cast-iron, but which will be provided with renewable bearings, preferably of hard metal, for the adjusting-screws and hard-metal ways for the jaws to slide upon, which hard-metal parts are removable and can be readily introduced into the body and secured in position.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved chuck, a portion whereof is broken away and the jaw removed. Fig. 2 is a section taken practically on the lines 2 2 of Figs. 1 and 3, the view being drawn upon an enlarged scale. Fig. 3 is a section taken substantially on the line 3 3 of Fig. 2, being drawn on the same scale as Fig. 2; and Fig. 4 is a detail perspective view of a bearing for an adjusting-screw.

A represents the carrier or body of the chuck, which is provided with the customary attaching-plate B, a central opening 10, and radial slots 11, having enlarged central portions 12 to receive the body or threaded section of the adjusting-screws 13, and C represents the jaws, having sliding movement in the slots 11, which jaws are provided with the usual lower threaded surfaces 14 for engagement with the adjusting-screws 13.

The adjusting-screws are provided with outer trunnions 15 and inner trunnions 16, adapted to turn in hard metal or other renewable bearings D, fitted in the inner and outer end portions of the slots 11 at their bottom. These bearings are made of hard metal because in the use of the chuck all the strain on the body of the chuck imparted by the action of the jaws is sustained at the points $a$ and $a'$, where the trunnions of the screw join the body, as is illustrated in Fig. 3, and if the metal is soft at such points, as is customary, it soon wears to such an extent that the screws cannot be depended upon for proper adjustment of the jaws, and the entire chuck is rendered useless, whereas the lifetime of a chuck is greatly extended by the use of the hard-metal bearings D, as, should they become worn, they can be readily replaced by others.

The bearings are semicircular in general contour, as is illustrated in Fig. 4, and are provided with an exterior circumferential centrally-located groove 17, and the bearing which is at the outer end of the slot is also provided with an interior annular recess 18 at its outer end to accommodate the polygonal head 19 of the outer trunnion 15 of a screw, as illustrated in Figs. 1 and 3. Each bearing is likewise provided with a threaded aperture 20, usually located at or about its center, and the outer bearings are held in place by screws 21, passed through the body or carrier of the chuck from the outside, while preferably the inner bearings D are held in place by screws 22, passed from the inner face of the bearings into the body of the chuck, and where the bearings D are fitted in the slots 11 semicircular ribs 23 are formed, which snugly fit into the exterior recesses 17 of the bearings.

In order that there shall be but little wear on the body of the chuck through the action of the jaws C, the slideways 24, on which the said jaws move, are made also of hard metal and are removable, being fitted in suitable recesses in the side walls of the said slots 11, as is clearly illustrated in Fig. 2.

With the construction and arrangement described, the slideways and jaws can be easily removed, and the screws and bearings can then readily be removed from the front face of the body of the chuck and the bearings when worn replaced by new ones.

Having thus described my invention, I claim as new and desire to secure by Letters Patent—

1. The combination with the body of the chuck, of metal bearings removably secured in slots in the front face of the body of the chuck, adjusting-screws having trunnions adapted to be received by said bearings, and jaws removably held in engagement with the screws, whereby the screws and bearings can be readily removed from the front face of the chuck when the jaws are removed, for the purpose set forth.

2. In a chuck, a body having slots in its front face, and provided with recesses in the side walls of the slots, bearings removably fitted in the ends of the slots, adjusting-screws having trunnions received by said bearings, jaws for engagement with the adjusting-screws, and removable hard-metal slideways fitted in the recesses in the side walls of the slots, upon which slideways said jaws have movement, the removable slideways also serving to hold the jaws in engagement with the screws.

3. The combination with the body of a chuck provided in its front face with slots having enlarged central portions, and the adjusting-screws provided with trunnions, the outer trunnions having polygonal heads, of removable semicircular hard-metal bearings for the trunnions of the adjusting-screws, the said bearings being fitted in the inner and outer portions of the slots in the face of the chuck-body, the bearings for the outer trunnions being each provided with an interior recess at its outer end to accommodate the head of the trunnion of a screw.

4. The combination with the body of a chuck having slots in its front face, and its adjusting-screws having inner and outer trunnions, of semicircular hard-metal bearings for the said trunnions fitted in the inner and outer portions of said slots, the bearings for the trunnions being provided with exterior grooves and the body of the chuck with semicircular ribs which enter the said grooves when the bearings are in position in the body, the said bearings for the outer trunnions being each further provided with an interior annular recess at its outer end to receive the head of a trunnion, and jaws removably held in engagement with the adjusting-screws and having sliding movement in the slots in the chuck-body 5. A chuck-body having its front face provided with slots, bearings removably secured in the inner and outer ends of the slots and open at the front face of the body of the chuck, removable jaws adapted to slide in said slots, and adjusting-screws for the jaws arranged in said slots and having trunnions adapted to enter the open sides of the bearings and turn therein, whereby when the jaws are removed the screws and bearings can be readily removed from the front face of the body of the chuck.

6. The combination with the body of a chuck provided with radial slots in its front face having enlarged central portions, removable bearings fitted in the inner and outer end portions of the slots, adjusting-screws having threaded portions adapted to be received in the enlarged portions of the slots, the screws being provided with trunnions fitting in the said bearings, jaws having sliding movement in said slots and provided with threaded surfaces for engagement with the adjusting-screws, and removable slideways for the jaws fitted in recesses in the side walls of the slots and holding the jaws in place.

In testimony whereof I have signed my name to this specification in the presence of two subscribing witnesses.

WILLIAM CYRUS BRIGGS.

Witnesses:
    ALFRED J. HATTON,
    ROBERT J. M. WELCH.